US 6,464,250 B1

(12) United States Patent
Faigle et al.

(10) Patent No.: US 6,464,250 B1
(45) Date of Patent: Oct. 15, 2002

(54) INFLATABLE CURTAIN WITH SLIDABLE TETHER

(75) Inventors: Ernst M. Faigle, Dryden; Charles E. Steffens, Jr., Washington; John N. Clark, III, Ray, all of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/610,065

(22) Filed: Jul. 5, 2000

(51) Int. Cl.⁷ .............................................. B60R 21/22
(52) U.S. Cl. ..................................... 280/730.2; 280/749
(58) Field of Search ........................... 280/728.1, 728.2, 280/730.1, 730.2, 749

(56) References Cited

U.S. PATENT DOCUMENTS

| | | | | |
|---|---|---|---|---|
| 3,687,485 A | * | 8/1972 | Campbell ................. | 280/730.2 |
| 3,774,936 A | * | 11/1973 | Barnett et al. ........... | 280/730.2 |
| 4,723,751 A | * | 2/1988 | Hale ...................... | 280/730.2 |
| 5,333,898 A | | 8/1994 | Stutz | |
| 5,460,409 A | * | 10/1995 | Conner .................... | 280/730.2 |
| 5,462,308 A | | 10/1995 | Seki et al. | |
| 5,480,181 A | | 1/1996 | Bark et al. | |
| 5,660,414 A | | 8/1997 | Karlow et al. | |
| 5,788,270 A | | 8/1998 | Haland et al. | |
| 5,865,462 A | | 2/1999 | Robins et al. | |
| 5,865,465 A | | 2/1999 | Bauer et al. | |
| 5,924,723 A | | 7/1999 | Brantman et al. | |
| 6,010,149 A | * | 1/2000 | Riedel et al. ............ | 280/730.2 |
| 6,037,961 A | * | 6/2000 | Bailey et al. ............ | 280/730.2 |
| 6,095,551 A | * | 8/2000 | O'Docherty ............. | 280/730.2 |
| 6,135,497 A | * | 11/2000 | Sutherland et al. ...... | 280/730.2 |
| 6,152,481 A | * | 11/2000 | Webber et al. ........... | 280/730.2 |
| 6,155,597 A | * | 12/2000 | Bowers et al. ........... | 280/730.2 |
| 6,168,191 B1 | * | 1/2001 | Webber et al. ........... | 280/730.2 |
| 6,186,536 B1 | * | 2/2001 | Fischer .................... | 280/730.2 |
| 6,224,091 B1 | * | 5/2001 | Eyrainer et al. ......... | 280/730.2 |
| 6,237,938 B1 | * | 5/2001 | Boxey ..................... | 280/730.2 |
| 6,237,939 B1 | * | 5/2001 | Resh ....................... | 280/730.2 |
| 6,237,943 B1 | * | 5/2001 | Brown et al. ............ | 280/730.2 |
| 6,237,999 B1 | * | 5/2001 | Hobson ................... | 280/730.2 |
| 6,273,458 B1 | * | 8/2001 | Steffen et al. ........... | 280/730.2 |
| 6,276,712 B1 | * | 8/2001 | Welch et al. ............. | 280/730.2 |
| 6,290,253 B1 | * | 9/2001 | Tietze et al. ............. | 280/730.2 |
| 6,299,199 B1 | * | 10/2001 | Bowers et al. .......... | 280/730.2 |
| 6,132,009 A1 | * | 11/2001 | Haland et al. ........... | 280/730.2 |
| 6,132,010 A1 | * | 11/2001 | Heigl ...................... | 280/730.2 |
| 6,375,216 B1 | * | 4/2002 | Eschbach ................. | 280/730.1 |

FOREIGN PATENT DOCUMENTS

| | | | | |
|---|---|---|---|---|
| DE | 4037485 | * | 5/1992 | ............. 280/730.2 |
| DE | 19654490 | | 6/1998 | |
| DE | 19704051 | | 8/1998 | |
| JP | 405139229 | * | 6/1993 | ............. 280/730.2 |
| JP | 405193430 | * | 8/1993 | ............. 280/730.2 |
| WO | 9743146 | | 11/1997 | |

* cited by examiner

Primary Examiner—Paul N. Dickson
Assistant Examiner—Toan C To
(74) Attorney, Agent, or Firm—Tarolli, Sundheim, Covell, Tummino & Szabo L.L.P.

(57) ABSTRACT

Apparatus (10) for helping to protect an occupant of a vehicle (12) comprises an inflatable vehicle occupant protection device (14) inflatable away from the vehicle roof (18) into a position between the side structure (16) of the vehicle and a vehicle occupant. The protection device (14), when inflated, has an upper edge (50) positioned adjacent the roof (18) and a lower edge (52) spaced from the roof. The protection device (14) also includes a guide (72, 74) and a flexible elongated member (70, 80) that extends through the guide and is slidable through the guide when the protection device is inflated. The member (70, 80) has two leg portions (110, 112) extending from the side structure (16) of the vehicle (12) to the protection device (14) when the protection device is inflated.

23 Claims, 4 Drawing Sheets

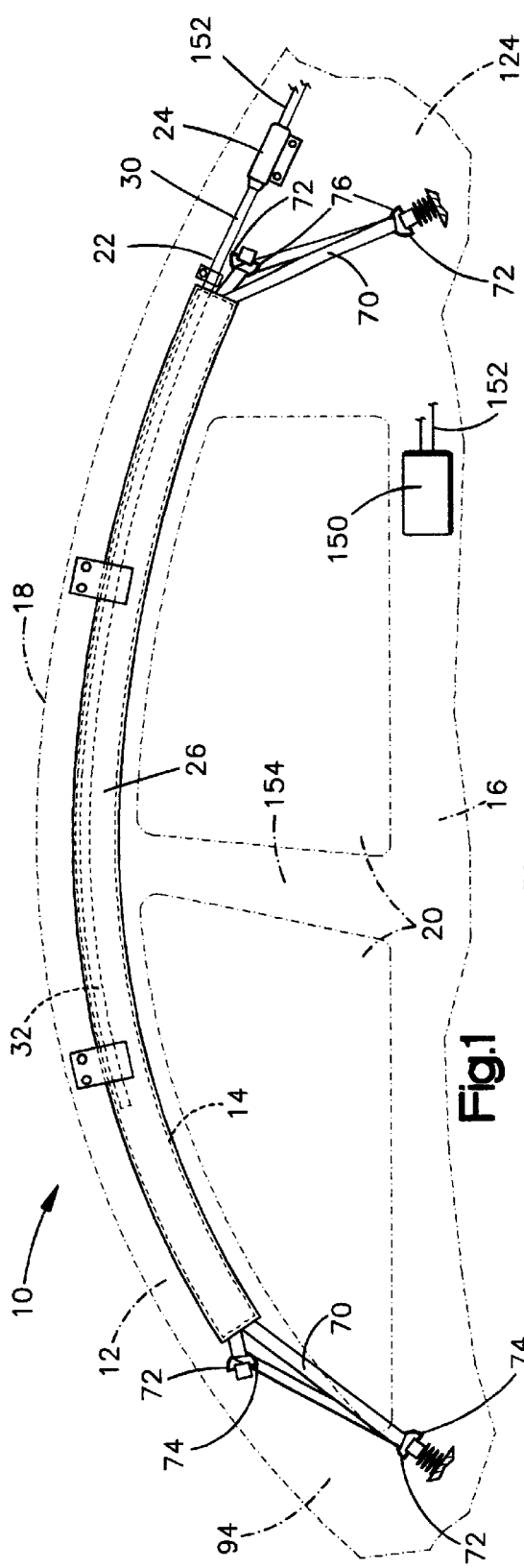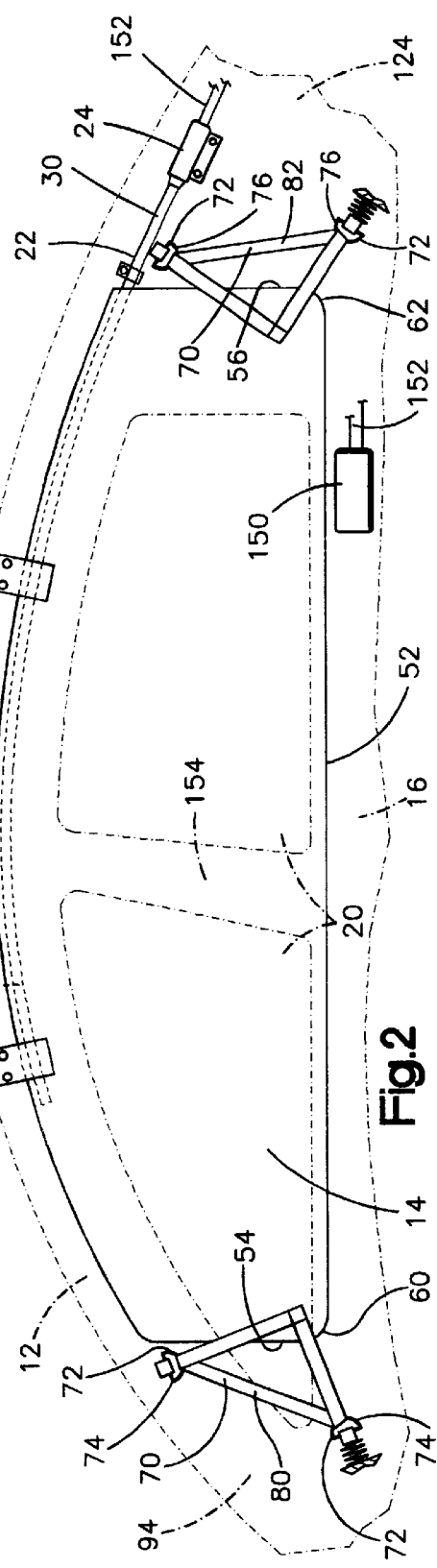

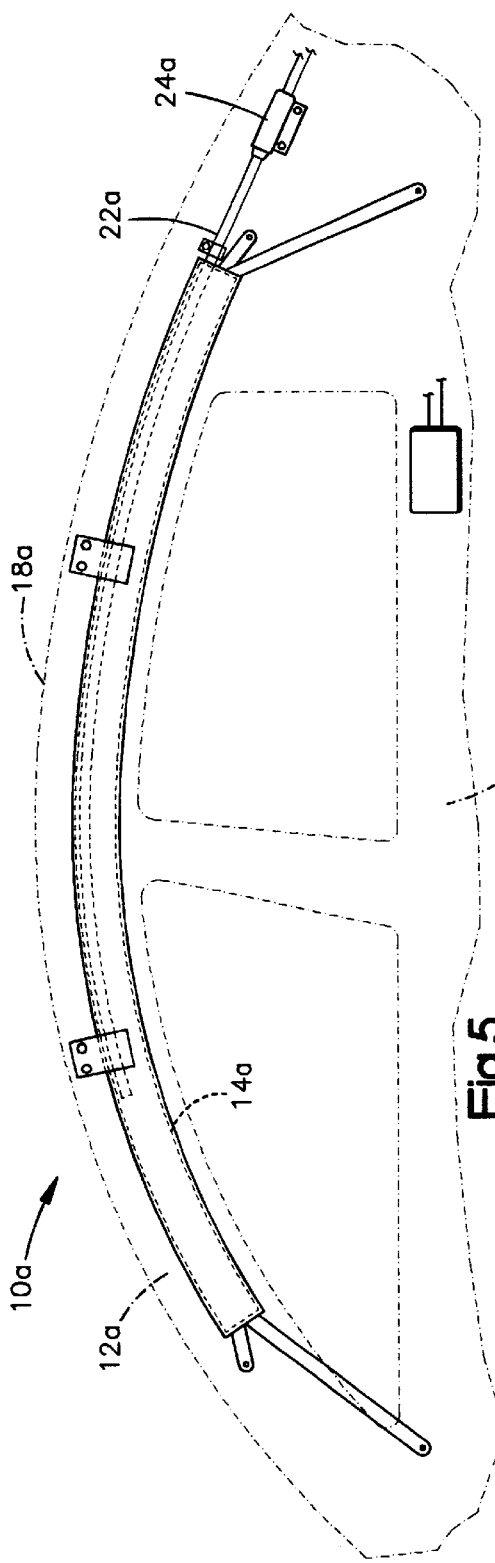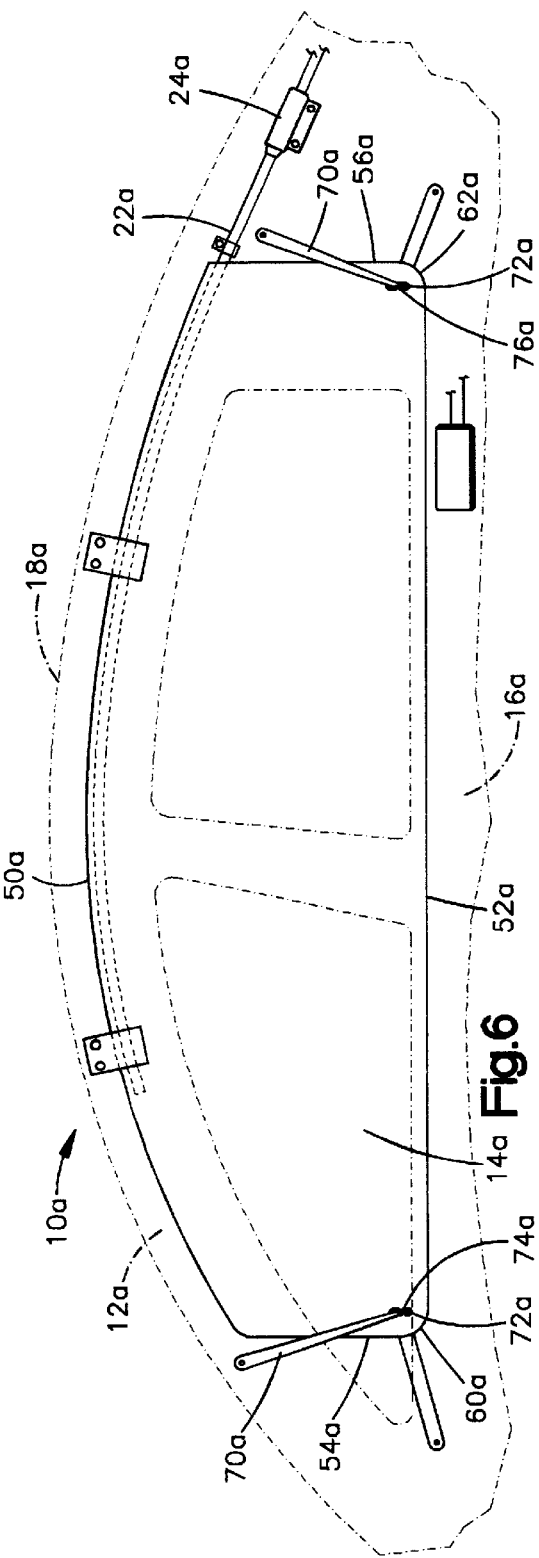

INFLATABLE CURTAIN WITH SLIDABLE TETHER

FIELD OF THE INVENTION

The present invention relates to an apparatus for helping to protect an occupant of a vehicle in the event of a side impact to the vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle that has a side structure and a roof. The apparatus includes an inflatable vehicle occupant protection device that is inflatable away from the vehicle roof into a position between the side structure of the vehicle and a vehicle occupant. The inflatable vehicle occupant protection device, when inflated, has an upper edge positioned adjacent the vehicle roof and a lower edge spaced apart from the vehicle roof. An inflation fluid source provides inflation fluid for inflating the inflatable vehicle occupant protection device. The inflatable vehicle occupant protection device also includes a guide and a flexible elongated member that extends through the guide and is slidable through the guide when the inflatable vehicle occupant protection device is inflated. The flexible elongated member has two leg portions extending from the side structure of the vehicle to the inflatable vehicle occupant protection device when the inflatable vehicle occupant protection device is inflated.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an apparatus for helping to protect an occupant of a vehicle illustrating the apparatus in a deflated condition;

FIG. 2 is a schematic view of the apparatus of FIG. 1 in an inflated condition;

FIG. 5 is a schematic view of an apparatus for helping to protect an occupant of a vehicle illustrating the apparatus in a deflated condition, according to a second embodiment of the invention;

FIG. 6 is a schematic view of the apparatus of FIG. 5 in an inflated condition;

DESCRIPTION OF THE PREFERRED EMBODIMENTS

Figure 3:
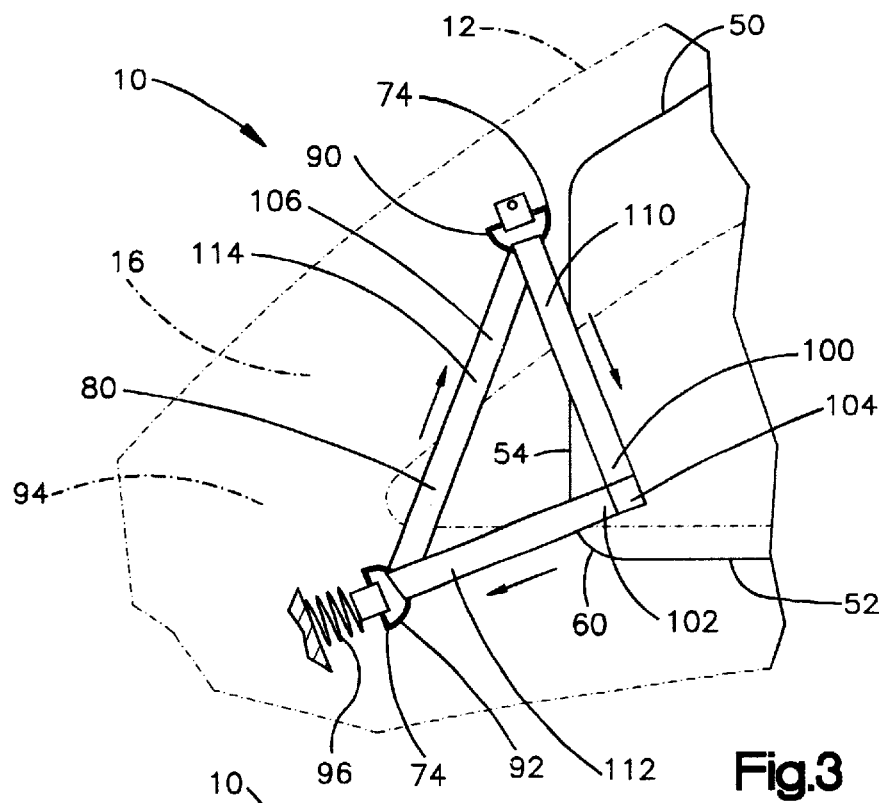
FIG. 3 is an enlarged view of a portion of the apparatus of FIG. 2.

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent to the side structure 16 of the vehicle 12 and a roof 18 of the vehicle. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32 disposed in the inflatable curtain 14. The second end portion 32 of the fill tube 22 has a plurality of openings (not shown) that provide fluid communication between the fill tube 22 and the inflatable curtain 14. It will be recognized by those skilled in the art that the fill tube 22 may be omitted and the inflator 24 may be connected in direct fluid communication with the inflatable curtain 14. In such a configuration, the inflator 24 would be connected to an end of the inflatable curtain 14 or to a location on the curtain between the ends of the curtain.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the inflatable curtain 14.

The apparatus 10 includes a housing 26 (FIG. 1) that stores the inflatable curtain 14 in a deflated condition. The fill tube 22, the deflated inflatable curtain 14, and housing 26 have an elongated configuration and extend along the vehicle roof 18 and along the side structure 16 of the vehicle 12 above the side windows 20.

The perimeter of the inflatable curtain 14 (FIG. 2) is defined by upper and lower edges 50 and 52, respectively, of the curtain and horizontally spaced front and rear edges 54 and 56, respectively, of the curtain. The front and rear edges 54 and 56 of the inflatable curtain 14 extend from the upper edge 50 to the lower edge 52 of the curtain. A lower front corner 60 of the inflatable curtain 14 is defined by the intersection of the front edge 54 and the lower edge 52 of the curtain. A lower rear corner 62 of the inflatable curtain 14 is defined by the intersection of the rear edge 56 and the lower edge 52 of the curtain. Although the front and rear edges 54 and 56 of the inflatable curtain 14 are illustrated as being generally vertical, the front edge of the curtain, in particular, could be formed by extending the upper and lower edges 50 and 52 until they intersect, in which case the lower front corner 60 would be defined by the intersection of the upper and lower edges.

The apparatus 10 (FIGS. 1 and 2) includes flexible elongated members 70 that connect the inflatable curtain 14 to the side structure 16 of the vehicle 12. The flexible elongated members 70 preferably are tethers constructed of a material such as fabric. In the deflated condition (FIG. 1), at least a portion of each of the flexible elongated members 70 is stored in the housing 26 along the vehicle roof 18 and along the side structure 16 of the vehicle 12 above the side windows 20.

The apparatus 10 (FIGS. 1 and 2) also includes guides 72 that are connected to the side structure 16 of the vehicle 12. A first guide 74 is positioned adjacent the front edge 54 of the inflatable curtain 14. A second guide 76 is positioned adjacent the rear edge 56 of the inflatable curtain 14.

A first flexible elongated member 80 (FIG. 2) is connected to the inflatable curtain 14 near the front edge 54 of the curtain. The first flexible elongated member 80 extends through the first guide 74 and is slidable through the first guide. A second flexible elongated member 82 is connected to the inflatable curtain 14 near the rear edge 56 of the curtain. The second flexible elongated member 82 extends through the second guide 76 and is slidable through the second guide.

As best shown in FIG. 3, the first guide 74 includes first and second guide members 90 and 92, respectively. The first and second guide members 90 and 92 preferably are rings, such as D-rings. The first and second guide members 90 and 92 are positioned forward of the front edge 54 of the inflatable curtain 14, on or near an A pillar 94 of the vehicle 12. The second guide member 92 may be positioned below the lower edge 52 of the inflatable curtain 14. The first and second guide members 90 and 92 are connected to the side structure 16 of the vehicle 12 by known means (not shown), such as fasteners. The second guide member 92 may be connected to the side structure 16 by a tensioning means, such as a spring. Such a tensioning means is illustrated schematically at 96 in FIG. 3.

The first flexible elongated member 80 has a first end portion 100 and an opposite second end portion 102 connected to the inflatable curtain 14 at a first location 104 on the curtain by known means (not shown), such as stitching. The first location 104 is positioned adjacent the front lower corner 60 of the inflatable curtain 14. The first flexible elongated member 80 forms a first loop of material 106 connected to the inflatable curtain 14 at the first location 104 and extending from the first location 104 through the first and second guide members 90 and 92. The first loop of material 106 is slidable through the first and second guide members 90 and 92.

The first loop of material 106 has first and second leg portions 110 and 112, respectively, that extend from the first and second guide members 90 and 92 on the side structure 16 of the vehicle 12 to the first location 104 on the inflatable curtain 14. A third leg 114 of the first loop of material 106 extends between the first and second guide members 90 and 92.

Figure 4:
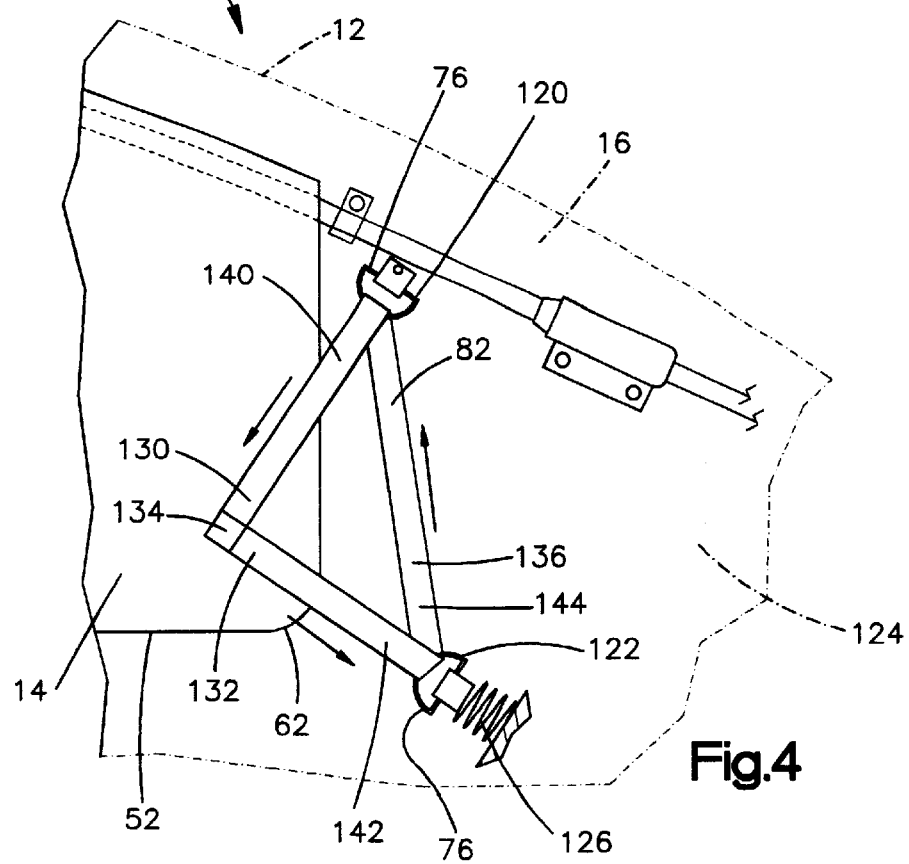
FIG. 4 is an enlarged view of another portion of the apparatus of FIG. 2.

As best shown in FIG. 4, the second guide 76 includes first and second guide members 120 and 122, respectively. The first and second guide members 120 and 122 preferably are rings, such as D-rings. The first and second guide members 120 and 122 are positioned rearward of the rear edge 56 of the inflatable curtain 14, on or near a C pillar 124 of the vehicle 12. The second guide member 122 may be positioned below the lower edge 52 of the inflatable curtain 14. The first and second guide members 120 and 122 are connected to the side structure 16 of the vehicle 12 by known means (not shown), such as fasteners. The second guide member 122 may be connected to the side structure 16 by a tensioning means, such as a spring. Such a tensioning means is illustrated schematically at 126 in FIG. 4.

The second flexible elongated member 82 has a first end portion 130 and an opposite second end portion 132 connected to the inflatable curtain 14 at a second location 134 on the curtain by known means (not shown), such as stitching. The second location 134 is positioned adjacent the rear lower corner 62 of the inflatable curtain 14. The second flexible elongated member 82 forms a second loop of material 136 connected to the inflatable curtain 14 at the second location 134 and extending from the second location 134 through the first and second guide members 120 and 122. The second loop of material 136 is slidable through the first and second guide members 120 and 122.

The second loop of material 136 has first and second leg portions 140 and 142, respectively that extend from the first and second guide members 120 and 122 on the side structure 16 of the vehicle 12 to the second location 134 on the inflatable curtain 14. A third leg 144 of the second loop of material 136 extends between the first and second guide members 120 and 122.

The vehicle 12 includes a sensor mechanism 150 (shown schematically in FIGS. 1 and 2) for sensing a side impact to the vehicle 12 and/or a rollover of the vehicle 12. The sensor mechanism 150 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 150 provides an electrical signal over lead wires 152 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 inflates under the pressure of the inflation fluid from the inflator 24. The housing 26 (FIG. 1) opens and the inflatable curtain 14 inflates away from the roof 18 in a downward direction as shown in the drawings and in a downward direction with respect to the direction of forward travel of the vehicle 12 into the position illustrated in FIG. 2.

The inflatable curtain 14, when inflated, extends along the side structure 16 of the vehicle 12 and is positioned between the side structure and any occupant of the vehicle. When the inflatable curtain 14 is in the inflated condition, the upper edge 50 is positioned adjacent to the intersection of the roof 18 and the side structure 16 of the vehicle 12. The front edge 54 is positioned adjacent to the A pillar 94 of the vehicle 12. The rear edge 56 of the inflatable curtain 14 is positioned adjacent to the C pillar 124 of the vehicle 12. The inflatable curtain 14 extends between the A pillar 94 and the C pillar 124 of the vehicle 12 and overlies at least a portion of the A pillar, C pillar, and a B pillar 154 of the vehicle.

It will be recognized by those skilled in the art that the inflatable curtain 14 may have alternative configurations. For example, in the illustrated embodiment, the inflatable curtain 14 extends between the A pillar 94 and the C pillar 124 of the vehicle 12. The inflatable curtain 14 could, however, extend between the A pillar 94 and the B pillar 154 only, in which case the second guide 76 would be located on or near the B pillar. The inflatable curtain 14 could also extend between the B pillar 154 and the C pillar 124 only, in which case the first guide 74 would be positioned on or near the B pillar. Also, in a vehicle having A, B, C, and D pillars (not shown), the inflatable curtain 14 could, when inflated, extend between the A pillar and the D pillar, in which case the second guide 76 would be positioned on or near the D pillar.

The inflatable curtain 14, when inflated, helps to protect a vehicle occupant in the event of a vehicle rollover or a side impact to the vehicle 12. When inflated, the inflatable curtain 14 is positioned along the side structure 16 of the vehicle 12 and helps to absorb the energy of impacts with the inflatable curtain and helps to distribute the impact energy over a large area of the curtain.

When the inflatable curtain 14 is inflated, the first loop of material 106 (FIG. 3) slides through the first and second guide members 90 and 92. As the inflatable curtain 14 moves from the stored condition of FIG. 1 to the inflated condition of FIG. 2, the first loop of material 106 (FIG. 3) slides through the first and second guide members 90 and 92 in the clockwise direction indicated generally by the arrows in FIG. 3. In addition, the second leg portion 112 shortens and the first leg portion 110 lengthens by similar amounts.

The length of the first loop of material 106 is approximately equal to the sum of the distances between the first location 104 and the first guide member 90, between the first location 104 and the second guide member 92, and between the first and second guide members 90 and 92 when the inflatable curtain 14 is in the inflated condition. This helps to reduce the amount of slack in the first loop of material 106 when the inflatable curtain 14 is inflated.

The length of the first loop of material 106 may be such that the first loop of material is tensioned when the inflatable curtain 14 is inflated. The tensioning member 96 may also help to tension the first loop of material 106. When the inflatable curtain 14 is inflated, the first loop of material 106 helps to maintain the curtain positioned adjacent to the side structure 16 of the vehicle 12 throughout the duration of the collision and/or vehicle rollover.

When the inflatable curtain 14 is inflated, the second loop of material 136 (FIG. 4) slides through the first and second guide members 120 and 122. As the inflatable curtain 14 moves from the stored condition of FIG. 1 to the inflated condition of FIG. 2, the second loop of material 136 (FIG. 4) slides through the first and second guide members 120 and 122 in the counterclockwise direction indicated generally by the arrows in FIG. 4. In addition, the second leg portion 142 shortens and the first leg portion 140 lengthens by similar amounts.

The length of the second loop of material 136 is approximately equal to the sum of the distances between the second location 134 and the first guide member 120, between the second location 134 and the second guide member 122, and between the first and second guide members 120 and 122 when the inflatable curtain 14 is in the inflated condition. This helps to reduce the amount of slack in the second loop of material 136 when the inflatable curtain 14 is inflated.

The length of the second loop of material 136 may be such that the second loop of material is tensioned when the inflatable curtain 14 is inflated. The tensioning member 126 may also help to tension the second loop of material 136. When the inflatable curtain 14 is inflated, the second loop of material 136 helps to maintain the curtain positioned adjacent to the side structure 16 of the vehicle 12 throughout the duration of the collision and/or vehicle rollover.

A second embodiment of the present invention is illustrated in FIGS. 5–8. The second embodiment of the invention is similar to the first embodiment of the invention illustrated in FIGS. 1–4. Accordingly, numerals similar to those of FIGS. 1–4 will be utilized in FIGS. 5–8 to identify similar components, the suffix letter "a" being associated with the numerals of FIGS. 5–8 to avoid confusion. The apparatus 10a (FIGS. 5–8) of the second embodiment is identical to the apparatus 10 (FIGS. 1–4), except that the flexible elongated members 70a and the guides 72a (FIGS. 5–8) have a different configuration than the flexible elongated members 70 and the guides 72 (FIGS. 1–4) of the first embodiment.

As illustrated in FIG. 6, the guides 72a are located on the inflatable curtain 14a. The first guide 74a is positioned adjacent the front lower corner 60a of the inflatable curtain 14a. The second guide 76a is positioned adjacent the rear lower corner 62a of the inflatable curtain 14a.

Figure 7:
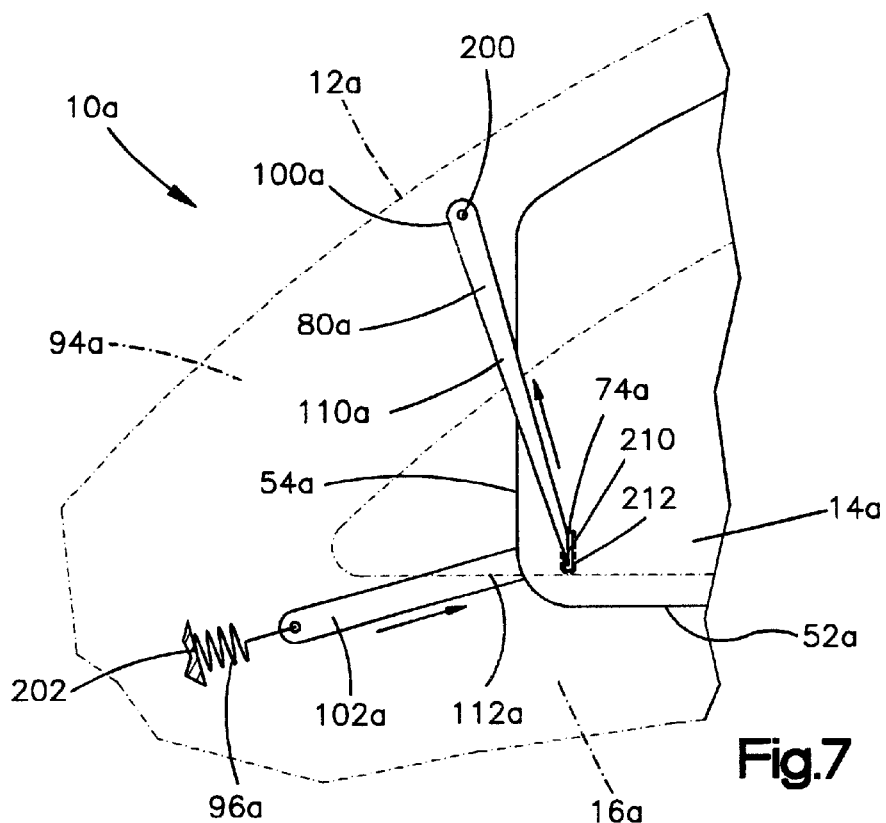
FIG. 7 is an enlarged view of a portion of the apparatus of FIG. 6.

As illustrated in FIG. 7, the first end portion 100a of the first flexible elongated member 80a is connected to the side structure 16a of the vehicle 12a at a first location 200 by known means (not shown), such as a fastener. The first location 200 is positioned forward of the front edge 54a of the curtain on or near the A pillar 94a of the vehicle 12a. The second end portion 102a of the first flexible elongated member 80a is connected to the side structure 16a of the vehicle 12a at a second location 202 by known means (not shown), such as a fastener. The second end portion 102a may be connected to the side structure 16a of the vehicle by a tensioning means 96a, such as a spring. The second location 202 is positioned forward of the front edge 54a of the curtain, on or near the A pillar 94a of the vehicle 12a, and may be positioned below the lower edge 52a of the curtain. The first flexible elongated member 80a extends from the first location 200 through the first guide 74a to the second location 202 and is slidable through the first guide.

The first guide 74a comprises a guide member 210 in the form of an edge of the inflatable curtain 14a that defines an aperture 212 extending through the curtain. The guide member 210 may have alternative constructions, for example, such as a D-ring connected to the inflatable curtain 14a. The first flexible elongated member 80a is slidable through the guide member 210.

The first flexible elongated member 80a has first and second leg portions 110a and 112a that extend from the first and second locations 200 and 202, respectively, on the side structure 16a of the vehicle 12a to the guide member 210 on the inflatable curtain 14a.

Figure 8:
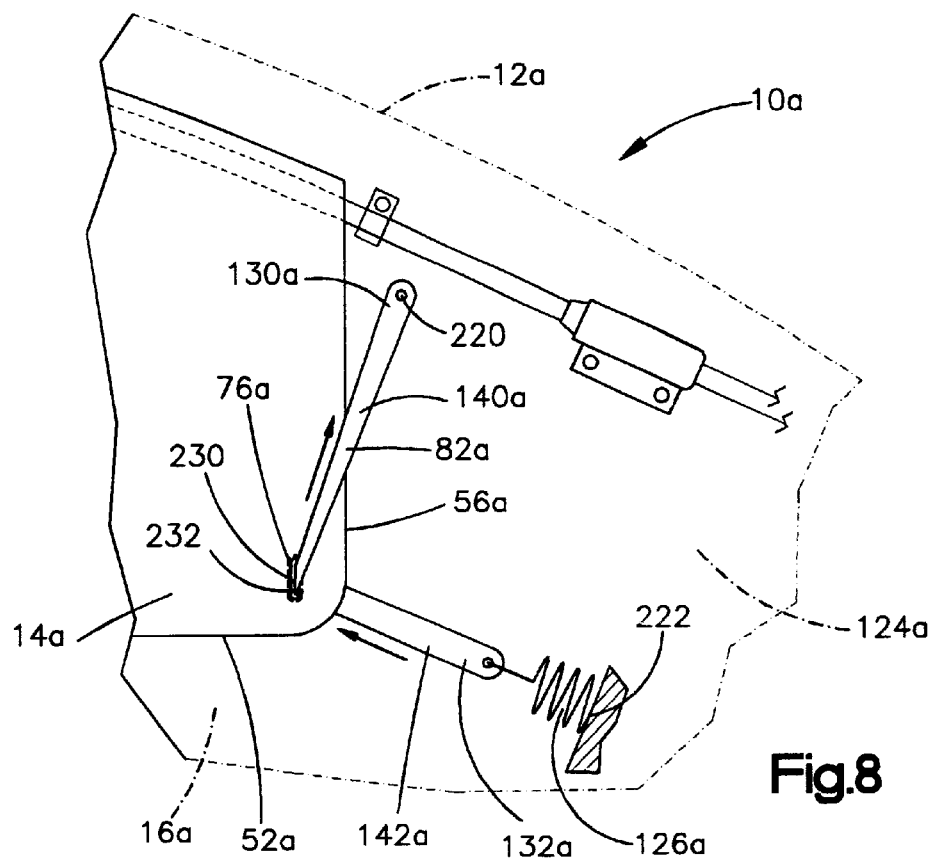
FIG. 8 is an enlarged view of another portion of the apparatus of FIG. 6.

As illustrated in FIG. 8, the first end portion 130a of the second flexible elongated member 82a is connected to the side structure 16a of the vehicle 12a at a first location 220 by known means (not shown), such as a fastener. The first location 220 is positioned rearward of the rear edge 56a of the curtain on or near the C pillar 124a of the vehicle 12a. The second end portion 132a of the second flexible elongated member 82a is connected to the side structure 16a of the vehicle 12a at a second location 222 by known means such as a fastener. The second end portion 132a may be connected to the side structure 16a of the vehicle by a tensioning means, such as a spring. Such a tensioning means is illustrated schematically at 126a in FIG. 8. The second location 222 is positioned rearward of the rear edge 56a of the curtain, on or near the C pillar 124a of the vehicle 12a, and may be positioned below the lower edge 52a of the curtain. The second flexible elongated member 82a extends from the first location 220 through the second guide 76a to the second location 222 and is slidable through the second guide.

The second guide 76a comprises a guide member 230 in the form of an edge of the inflatable curtain 14a that defines an aperture 232 extending through the curtain. The guide member 230 may have alternative constructions, such as a D-ring connected to the inflatable curtain 14a. The second flexible elongated member 82a is slidable through the guide member 230.

The second flexible elongated member 82a has first and second leg portions 140a and 142a that extend from the first and second locations 220 and 222, respectively, on the side structure 16a of the vehicle 12a to the guide member 230 on the inflatable curtain 14a.

When the inflatable curtain 14a is inflated, the first flexible elongated member 80a (FIG. 7) slides through the guide member 210. As the inflatable curtain 14a moves from the stored condition of FIG. 5 to the inflated condition of FIG. 6, the first flexible elongated member 80a (FIG. 7) slides through the guide member 210 in the counterclockwise direction indicated generally by the arrows in FIG. 7. In addition, the second leg portion 112a shortens and the first leg portion 110a lengthens by similar amounts.

The length of the first flexible elongated member 80a is approximately equal to the sum of the distances between the first location 200 and the guide member 210, and between the second location 202 and the guide member 210 when the inflatable curtain 14a is in the inflated condition. This helps to reduce the amount of slack in the first flexible elongated member 80a when the inflatable curtain 14a is inflated.

The length of the first flexible elongated member 80a may be such that the first flexible elongated member is tensioned when the inflatable curtain 14a is inflated. The tensioning member 96a may also help to tension the first flexible elongated member 80a. When the inflatable curtain 14a is inflated, the first flexible elongated member 80a helps to maintain the curtain positioned adjacent to the side structure 16a of the vehicle 12a throughout the duration of the collision and/or vehicle rollover.

When the inflatable curtain 14a is inflated, the second flexible elongated member 82a (FIG. 8) slides through the guide member 230. As the inflatable curtain 14a moves from the stored condition of FIG. 5 to the inflated condition of FIG. 6, the second flexible elongated member 82a (FIG. 8) slides through the guide member 230 in the clockwise direction indicated generally by the arrows in FIG. 8. In addition, the second leg portion 142a shortens and the first leg portion 140a lengthens by similar amounts.

The length of the second flexible elongated member 82a is approximately equal to the sum of the distances between the first location 220 and the guide member 230, and between the second location 222 and the guide member 230 when the inflatable curtain 14a is in the inflated condition. This helps to reduce the amount of slack in the second flexible elongated member 82a when the inflatable curtain 14a is inflated.

The length of the second flexible elongated member 82a may be such that the second flexible elongated member is tensioned when the inflatable curtain 14a is inflated. The tensioning member 126a may also help to tension the second flexible elongated member 82a. When the inflatable curtain 14a is inflated, the second flexible elongated member 82a helps to maintain the curtain positioned adjacent to the side structure 16a of the vehicle 12a throughout the duration of the collision and/or vehicle rollover.

From the above description of the invention, those skilled in the art will perceive improvements, changes and modifications. For example, in the illustrated embodiments, the flexible elongated members and guides connect the inflatable curtain to the side structure of the vehicle at locations adjacent both the front and rear edges and of the curtain. It may be desirable, however, to connect the inflatable curtain to the side structure of the vehicle at a location adjacent to the front edge or rear edge of the curtain only. In this instance, only one flexible elongated member and one guide may be used to connect the inflatable curtain to the side structure of the vehicle. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:

an inflatable vehicle occupant protection device that is inflatable away from the vehicle roof into an inflated position between the side structure of the vehicle and a vehicle occupant;

an inflation fluid source that provides inflation fluid for inflating said inflatable vehicle occupant protection device;

first and second guide members connected to the side structure of the vehicle at different locations; and a flexible elongated member connected to said inflatable vehicle occupant protection device at a location on said inflatable vehicle occupant protection device to form a flexible loop of material extending from said location and returning to said location, said flexible loop of material extending through said first and second guide members and being slidable through said first and second guide members when said inflatable vehicle occupant protection device is inflated.

2. Apparatus as defined in claim 1, wherein said loop of material has a length that is generally equal to the sum of the distances between said location on said inflatable vehicle occupant protection device and said first guide member, between said location on said inflatable vehicle occupant protection device and said second guide member, and between said first and second guide members, when said inflatable vehicle occupant protection device is in said inflated position.

3. Apparatus as defined in claim 1, wherein said inflatable vehicle occupant protection device includes an upper edge positioned adjacent the vehicle roof, a lower edge spaced apart from the vehicle roof, and front and rear edges spaced apart horizontally along said upper and lower edges, said first and second guide members being spaced forward of said front edge of said inflatable vehicle occupant protection device.

4. Apparatus as defined in claim 3, wherein said second guide member is positioned below said lower edge of said inflatable vehicle occupant protection device.

5. Apparatus as defined in claim 3, wherein said first guide member located on an A pillar of the vehicle.

6. Apparatus as defined in claim 3, wherein said second guide member is located on an A pillar of the vehicle.

7. Apparatus as defined in claim 1, wherein said inflatable vehicle occupant protection device includes an upper edge positioned adjacent the vehicle roof, a lower edge spaced apart from the vehicle roof, and front and rear edges spaced apart horizontally along said upper and lower edges, said location at which said loop of material is connected to said inflatable vehicle occupant protection device being adjacent a front lower corner of said inflatable vehicle occupant protection device, said front lower corner being defined by the intersection of said lower edge and said front edge of said inflatable vehicle occupant protection device.

8. Apparatus as defined in claim 1, wherein said inflatable vehicle occupant protection device includes an upper edge positioned adjacent the vehicle roof, a lower edge spaced apart from the vehicle roof, and front and rear edges spaced apart horizontally along said upper and lower edges, said first and second guide members being spaced rearward of said rear edge of said inflatable vehicle occupant protection device.

9. Apparatus as defined in claim 8, wherein said second guide member is positioned below said lower edge of said inflatable vehicle occupant protection device.

10. Apparatus as defined in claim 8, wherein said first guide member is located on a C pillar of the vehicle.

11. Apparatus as defined in claim 8, wherein said second guide member located on a C pillar of the vehicle.

12. Apparatus as defined in claim 1, wherein said inflatable vehicle occupant protection device includes an upper edge positioned adjacent the vehicle roof, a lower edge spaced apart from the vehicle roof, and front and rear edges spaced apart horizontally along said upper and lower edges, said location at which said loop of material is connected to said inflatable vehicle occupant protection device being adjacent a rear lower corner of said inflatable vehicle occupant protection device, said rear lower corner being defined by the intersection of said lower edge and said rear edge of said inflatable vehicle occupant protection device.

13. Apparatus as defined in claim 1, further comprising means for tensioning said loop of material when said inflatable vehicle occupant protection device is inflated.

14. Apparatus as defined in claim 13, wherein said means for tensioning said loop of material connects said second guide member to the side structure of the vehicle.

15. Apparatus as defined in claim 13, wherein said means for tensioning said loop of material comprises a spring.

16. Apparatus as defined in claim 1, wherein said flexible elongated member has opposite end portions that are connected to each other and to said inflatable vehicle occupant protection device at said location on said inflatable vehicle occupant protection device to form said loop of material.

17. Apparatus as defined in claim 1, wherein said first and second guides members comprise rings connected to the side structure of the vehicle.

18. Apparatus as defined in claim 1, wherein said flexible elongated member is a tether.

19. Apparatus as defined in claim 1, wherein said inflatable vehicle occupant protection device, when inflated, extends along the side structure of the vehicle between an A pillar and a C pillar of the vehicle.

20. Apparatus as defined in claim 1, wherein said inflatable vehicle occupant protection device, when inflated, overlies at least a portion of an A pillar, a B pillar and a C pillar of the vehicle.

21. Apparatus as defined in claim 1, wherein said inflatable vehicle occupant protection device is an inflatable curtain having a stored position extending along the side structure adjacent to the vehicle roof, said inflatable curtain being inflated away from the vehicle roof into said position between the side structure of the vehicle and a vehicle occupant.

22. Apparatus as defined in claim 21 further including a fill tube having a portion located in said inflatable curtain, said inflation fluid source being in fluid communication with said fill tube, said inflation fluid source, when actuated, providing inflation fluid to said fill tube, said fill tube directing said inflation fluid into said inflatable curtain to inflate said inflatable curtain.

23. Apparatus as defined in claim 1, further comprising a sensor for sensing a vehicle condition for which deployment of said inflatable vehicle occupant protection device is desired, said sensor actuating said inflation fluid source to provide inflation fluid to inflate said inflatable vehicle occupant protection device.

* * * * *